United States Patent [19]
Gilsdorf et al.

[11] Patent Number: 5,539,351
[45] Date of Patent: Jul. 23, 1996

[54] CIRCUIT AND METHOD FOR REDUCING A GATE VOLAGE OF A TRANSMISSION GATE WITHIN A CHARGE PUMP CIRCUIT

[76] Inventors: Ben Gilsdorf, 19639 N. 3rd Dr., Phoenix, Ariz. 85027; Gary W. Hoshizaki, 4038 E. Glade Cir., Mesa, Ariz. 85206; John H. Quigley, 1442 E. Desert Trumpet, Phoenix, Ariz. 85044

[21] Appl. No.: 334,176

[22] Filed: Nov. 3, 1994

[51] Int. Cl.$^6$ .............................. H03K 17/16; G05F 1/10
[52] U.S. Cl. ..................... 327/379; 327/391; 327/530; 327/535; 327/536; 327/537
[58] Field of Search ..................... 327/535, 536, 327/537, 391, 392, 395, 379, 530; 323/311

[56] References Cited

U.S. PATENT DOCUMENTS 5,392,205  2/1995  Zavaleta ........................ 323/311
5,434,525  7/1995  Leonowich ..................... 327/395

*Primary Examiner*—David C. Nelms
*Assistant Examiner*—Trong Phan
*Attorney, Agent, or Firm*—Gary W. Hoshizaki

[57] ABSTRACT

A circuit and method for reducing a gate voltage of a transmission gate to prevent overvoltage that could damage or affect reliability of the transmission gate. The transmission gate resides in a charge pump circuit (41) coupled to a capacitor for generating a voltage greater than a power supply voltage. A buffer (44,45) receives a control signal and couples to a gate terminal of the transmission gate. The buffer (44,45) includes a power supply terminal that is coupled to a variable voltage reference (43). The variable voltage reference (43) provides a voltage that reduces the gate voltage of the transmission gate when an output voltage of the charge pump circuit reaches a predetermined voltage. The variable voltage reference (43) reduces a voltage range between logic levels provided by the buffer (44,45) to protect the transmission gate from an excessive voltage.

18 Claims, 6 Drawing Sheets

CIRCUIT AND METHOD FOR REDUCING A GATE VOLAGE OF A TRANSMISSION GATE WITHIN A CHARGE PUMP CIRCUIT

BACKGROUND OF THE INVENTION

This invention relates, in general, to circuits requiring voltages exceeding a power supply voltage, and more particularly, to charge pump voltage circuits.

A charge pump circuit is a circuit that generates a voltage greater than it receives. In general, a charge pump circuit works through the alternate steps of charging a charge capacitor and then placing the charge capacitor in series with a voltage source or other voltage element (such as a second charged capacitor) to create an increased voltage.

The charge capacitor is coupled from a charge configuration to a series configuration by switches. The switches are controlled by a control logic circuit. Higher voltages may be generated by charging more than one capacitor and placing them in series to generate a desired voltage.

In general, a storage capacitor is used in conjunction with the charge capacitor for providing a continuous voltage to a circuit. For example, a storage capacitor is coupled to a circuit for providing a voltage greater than a power supply voltage. A charged storage capacitor cannot sustain a voltage to the circuit indefinitely, it must be recharged to maintain the voltage. A charge capacitor in a series configuration is used for charging the storage capacitor.

For example, in a first cycle, a charge capacitor is charged up to a power supply voltage. A storage capacitor maintains a voltage to a circuit during the first cycle. The voltage provided by the storage capacitor decreases as it discharges due to the circuit loading. In a second cycle, the charge capacitor is coupled in a series configuration with the power supply voltage (or other voltage source) to generate an increased voltage. The charge capacitor is then coupled to the storage capacitor for charging the storage capacitor. The charge capacitor is decoupled from the storage capacitor after providing charge to increase the voltage of the storage capacitor. The first and second cycles are continuously repeated to maintain the voltage on the storage capacitor above a minimum value. The size of the charge and storage capacitors and the frequency in which the first and second cycle is repeated is dependent on the circuit loading.

An example of a device requiring voltages greater than a power supply voltage normally provided for semiconductor circuits is a Liquid Crystal Display (LCD). A power supply voltage Vdd is provided to power integrated circuits that operate in conjunction with the LCD. Four logic levels are required in the operation of a typical LCD (Ground, Vdd, 2*Vdd, and 3*Vdd). A charge pump circuit that triples the power supply voltage is used to generate the 2*Vdd and 3*Vdd voltages. If the charge pump circuit is integrated with an integrated circuit (operating at the power supply voltage Vdd) there is a possibility that the voltage generated by the charge pump circuit could exceed device specifications of the integrated circuit. The stress on the devices in the charge pump due to the elevated operating voltages could degrade device performance or worse a catastrophic failure could occur.

It would be of great benefit if a circuit and method could be provided for operating a charge pump circuit such that the voltage on the devices within the charge pump circuit is reduced.

DETAILED DESCRIPTION OF THE DRAWINGS

A general trend in the semiconductor industry is to decrease transistor size and to reduce power supply thereby increasing circuit density and minimizing power dissipation. A problem exists in that not all circuitry operates at a power supply voltage of an integrated circuit. Adding additional power supply circuits to provide different voltages is not cost effective in some circumstances nor is it efficient when product must be small and lightweight. A charge pump circuit is a well known solution for efficiently generating an increased voltage from a power supply voltage.

A charge pump circuit receives an input voltage, typically a power supply voltage, and produces an output voltage greater than the input voltage. In general, charge pump circuits are built in configurations that provide an output voltage that is some multiple of the input voltage, for example a voltage doubler or a voltage tripler. A basic principle used in all charge pump circuits is to charge a capacitor to a predetermined voltage and then place the charged capacitor in series with a voltage source (power supply) or another voltage element (such as a charged capacitor). A series configuration of elements adds the voltage of each element together to produce an increased voltage. Elements are placed in a series configuration with switches.

Figure 1:
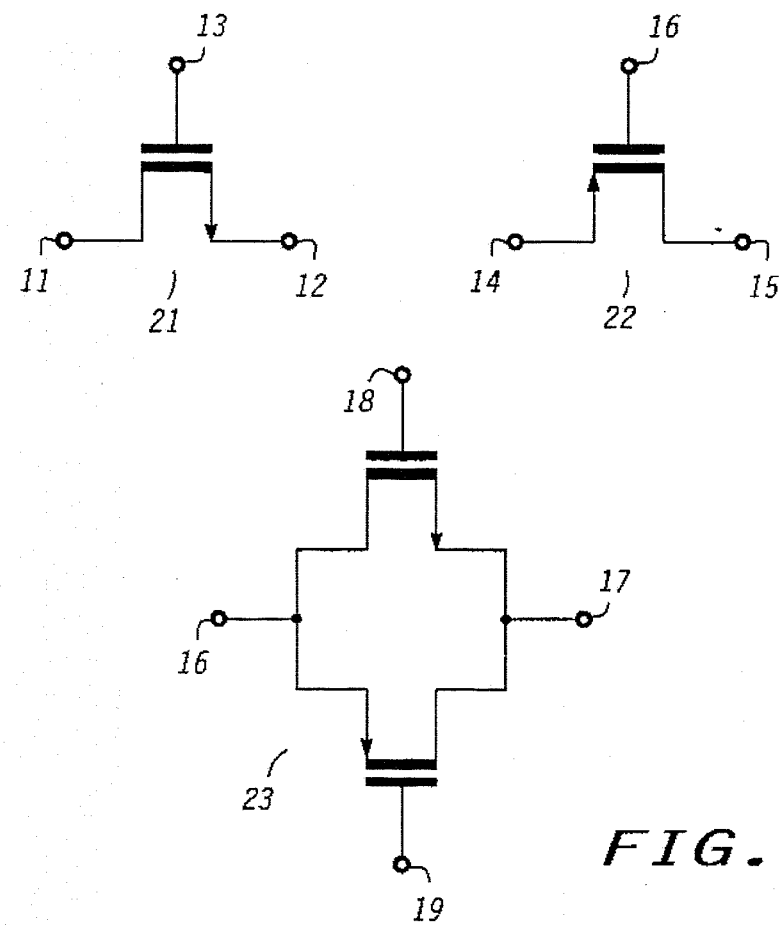
FIG. 1 is a schematic diagram of three transmission gate configurations commonly used as switches in a charge pump circuit.

A Field Effect Transistor (FET) is used for a switch when integrated a charge pump circuit on an integrated circuit. For example, CMOS (Complementary Metal Oxide Semiconductors) FETs are used as switches, either a single device or as a complementary pair. A common name for a FET switch is a transmission gate. FIG. 1 is a schematic diagram of three transmission gate configurations commonly used as switches in a charge pump circuit. A FET has a gate, a drain, and a source. A drain and source of a FET correspond to switch terminals of a switch. A FET is enabled for coupling the drain to the source by applying a gate voltage to the device. A gate voltage is defined as a voltage from gate to drain or gate to source of a FET.

A PET is an effective switch or transmission gate. A FET conducts by forming a conductive channel from drain to source when a gate voltage is applied to the device. Increasing the gate voltage increases the channel and reduces channel resistance. A MOSFET (Metal Oxide Semiconductor Field Effect Transistor) has a gate isolated from a bulk material by a thin layer of gate oxide. A gate voltage of a MOSFET places a large electric field across the layer of gate oxide. A catastrophic failure of a device or long term reliability problems may occur if a gate voltage of the device exceeds a specification of the MOSFET process. A charge pump circuit may generate an output voltage greater than the process specifications of a transmission gate. The output voltage of the charge pump circuit is used to enable and disable transmission gates of the charge pump circuit, thus devices which form the transmission gates are placed in a condition where failure or reliability may be at issue.

Prior art charge pump circuits eliminate the potential problem of overstressing a FET device of a transmission gate by increasing its gate oxide thickness. A thicker gate oxide is able to withstand higher gate voltages without decreasing reliability. Modifying a wafer process flow to increase gate oxide on a few devices is expensive and reduces manufacturability due to the additional wafer process steps required. A better solution which is described hereinafter is to provide a circuit solution to reduce the gate voltage across the transmission gates thereby allowing a standard wafer process to be used.

A transmission gate 21 is a single n-channel enhancement MOSFET. Transmission gate 21 has a drain 11, a gate 13, and a source 12 respectively corresponding to a first electrode, a control electrode, and a second electrode. A transmission gate 22 is a single p-channel enhancement MOSFET. Transmission gate 22 has a drain 15, a gate 16, and a source 14 respectively corresponding to a first electrode, a control electrode, and a second electrode. Both transmission gate 21 and transmission gate 22 are not perfect switches. An input voltage applied to the drain of transmissions gates 21 and 22 will generate a voltage at the source that differs by the device threshold voltage. A common solution to this problem is to use a circuit technique known as "bootstrapping" that increases the voltage at the gate of the transmission gate by more than a threshold voltage thereby allowing a transmission gate to pass a voltage equal to its input voltage.

A transmission gate 23 comprises a p-channel and n-channel enhancement MOSFET. The p and n-channel enhancement MOSFETs have a drain, a gate, and a source respectively corresponding to a first electrode, a control electrode, and a second electrode. The p-channel enhancement MOSFET has a drain coupled to a terminal 17, a gate 19, and a source coupled to terminal 16. The n-channel enhancement MOSFET has a drain coupled to terminal 16, a gate 18, and a source coupled to terminal 17. Transmission gate 23 uses both n and p-channel MOSFETs to eliminate the need for bootstrapping. Transmission gate 23 requires complementary signals on the gates 18 and 19 increasing the circuitry required to use transmission gate 23.

Figure 2:
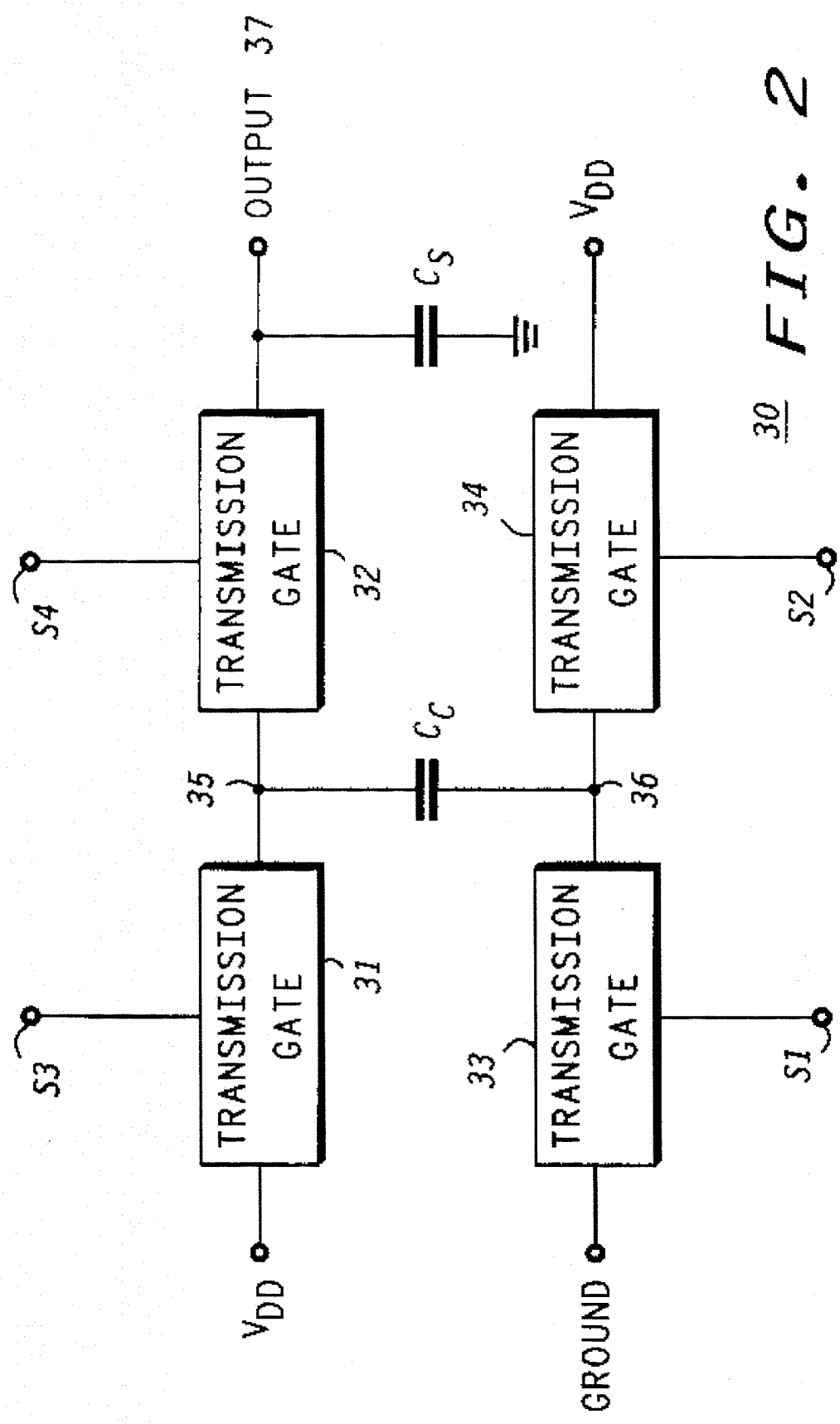
FIG. 2 is an schematic diagram of a basic charge pump circuit.

FIG. 2 is an schematic diagram of a basic charge pump circuit 30. The basic operating principals of charge pump circuit 30 are described hereinafter and apply to almost all charge pump circuits for generating a voltage greater than a power supply voltage. Charge pump circuit 30 approximately doubles a power supply voltage Vdd and illustrates how a gate voltage is generated that could damage either a transmission gate 31 or a transmission gate 32 when formed with a FET. Charge pump circuit 30 comprises transmission gates 31-34 and capacitors Cc and Cs. For illustration purposes assume that transmission gates 31-34 are n-channel enhancement MOSFETs although any of the transmission gate types described in FIG. 1 could be used.

Transmission gate 31 couples the power supply voltage Vdd to charge capacitor Cc. Transmission gate 31 includes a first terminal coupled for receiving the power supply voltage Vdd, a second terminal coupled to a node 35, and a gate terminal S3. Transmission gate 32 couples capacitor Cc to capacitor Cs. Transmission gate 32 includes a first terminal coupled to node 35, a second terminal coupled to an output 37, and a gate terminal S4. Capacitor Cs is a storage capacitor for providing an output voltage greater than the power supply voltage Vdd. Capacitor Cc is a charge capacitor for charging capacitor Cs to the output voltage greater than the power supply voltage Vdd. Capacitor Cs includes a first terminal coupled to output 37 and a second terminal coupled to ground. Capacitor Cc has first terminal coupled to node 35 and a second terminal coupled to a node 36. Transmission gate 33 couples capacitor Cc to ground. Transmission gate 33 includes a first terminal coupled to ground, a second terminal coupled to node 36, and a gate terminal S1. Transmission gate 34 couples the power supply voltage Vdd to charged capacitor Cc. Transmission gate 34 places a charged capacitor Cc in series with the power supply voltage Vdd to generate a voltage greater than the power supply voltage Vdd. Transmission gate 34 includes a first terminal coupled to node 36, a second terminal coupled for receiving the power supply voltage Vdd, and a gate terminal S2.

An initialization process involves charging both capacitors Cc and Cs to the power supply voltage Vdd. The initialization process occurs during startup when capacitors Cc and Cs are discharged. An enabling signal is provided to gate terminals S1, S3, and S4. Capacitor Cc is charged to the power supply voltage Vdd through transmission gates 31 and 33. Capacitor Cs is charged to the power supply voltage Vdd through transmission gates 31 and 32.

A charging sequence comprising a first cycle and a second cycle is continuously repeated after the initialization process. In the first cycle, transmission gates 31 and 33 are disabled and transmission gates 32 and 34 are enabled. Transmission gate 34 places the power supply voltage Vdd in series with charged capacitor Cc generating a voltage greater than the power supply voltage Vdd at node 35. Transmission gate 32 couples the storage capacitor Cs to node 35. Capacitor Cc charges capacitor Cs until the voltage at node 35 and output 37 are approximately equal. Transmission gates 32 and 34 are then disabled thereby decoupling node 35 from output 37. The output voltage at output 37 is increased during the first cycle. The amount of voltage increase on capacitor Cs is dependent on the capacitance values of Cc and Cs and the period of the first cycle.

In the second cycle, capacitor Cc is charged to the power supply voltage Vdd. Transmission gates 31 and 33 are enabled to charge capacitor Cc. Transmission gate 31 couples the power supply voltage Vdd to node 35 while transmission gate 33 couples node 36 to ground. The first cycle is repeated after capacitor Cc is charged.

The first and second cycles are repeated until the output voltage at output 37 approaches twice the power supply voltage Vdd. In general, output 37 is loaded by a circuit. Capacitor Cs must not discharge all the charge provided by capacitor Cc during the second cycle due to the circuit loading. This will allow the output voltage to continually rise after each charging sequence.

The gates of transmission gates 33 and 34 are not stressed during a charging sequence. A gate voltage approximately the power supply voltage Vdd is applied to the gate terminals S1 and S2 to enable transmission gates 33 and 34. A voltage of approximately the power supply voltage Vdd plus an n-channel enhancement MOSFET threshold voltage (Vth) is applied at gate terminal S4 of transmission gate 34 to insure transmission gate 34 acts as a switch. The increased voltage at gate terminal S4 (slightly greater than the power supply voltage Vdd) is generated by well known bootstrapping techniques widely used in the semiconductor industry. The gate voltage of a transmission gate is a voltage difference between the voltage at the gate and the voltage at either the drain or source. For transmission gates 33 and 34 the gate voltage does not exceed Vdd+Vth which is within the tolerances of most semiconductor device specifications.

Transmission gates 31 and 32 are subjected to voltages that are substantially greater than the power supply voltage Vdd and could potentially damage the gate oxide of the transistor forming the transmission gate. Gate terminal S4 of transmission gate 32 requires a voltage approximately a threshold voltage (Vth) greater than the output voltage to insure a maximum voltage transfer from node 35 to output 37. The voltage for powering circuitry enabling transmission gate 32 (a n-channel enhancement MOSFET) is typically provided from output 37 using a bootstrapping technique to increase the voltage an additional amount.

In a first cycle, capacitor Cc is placed in series with the power supply voltage Vdd. The capacitor Cc charges capacitor Cs until node 35 and output 37 are at approximately the same voltage. The output voltage at output 37 is greater than the power supply voltage Vdd and in the limit approaches 2*Vdd (twice the power supply voltage). Transmission gate 31 (a n-channel enhancement MOSFET) is disabled by a logic zero level at gate terminal S3. A logic zero level is typically the lowest voltage potential available, which in this example is ground. The gate voltage of transmission gate 31 (having gate terminal S3 coupled to ground) during a first cycle is approximately the output voltage at output 37. The stress on the device which comprises transmission gate 31 increases as the output voltage at output 37 continues to increase with each charge sequence.

Similarly, transmission gate 32 is stressed by an increasing output voltage at output 37. In a second cycle, capacitor Cc is charged to the power supply voltage Vdd. Transmission gate 32 is disabled by a logic zero level (ground) at gate terminal 32. The gate voltage of transmission gate 32 during a second cycle is approximately the output voltage at output 37. Prior art charge pump circuits utilize transistors with increased gate oxide thickness to form the transmission gates thereby allowing the transmission gates to withstand gate voltages which exceed the output voltage of the charge pump circuit.

A charge pump circuit utilizing transmission gates formed from FETs will have at least one transmission gate coupled to a capacitor that is subjected to voltages greater than a power supply voltage of the charge pump circuit. Reliability or failure in a device of the transmission gate could occur if the output voltage of the charge pump circuit produces a sustained gate voltage that exceeds device specifications. Building special devices that can withstand higher voltages is not a cost effective solution to the problem. An alternate solution that does not require special processing is to reduce the gate voltage on a device before the device specifications are exceeded.

Figure 3:
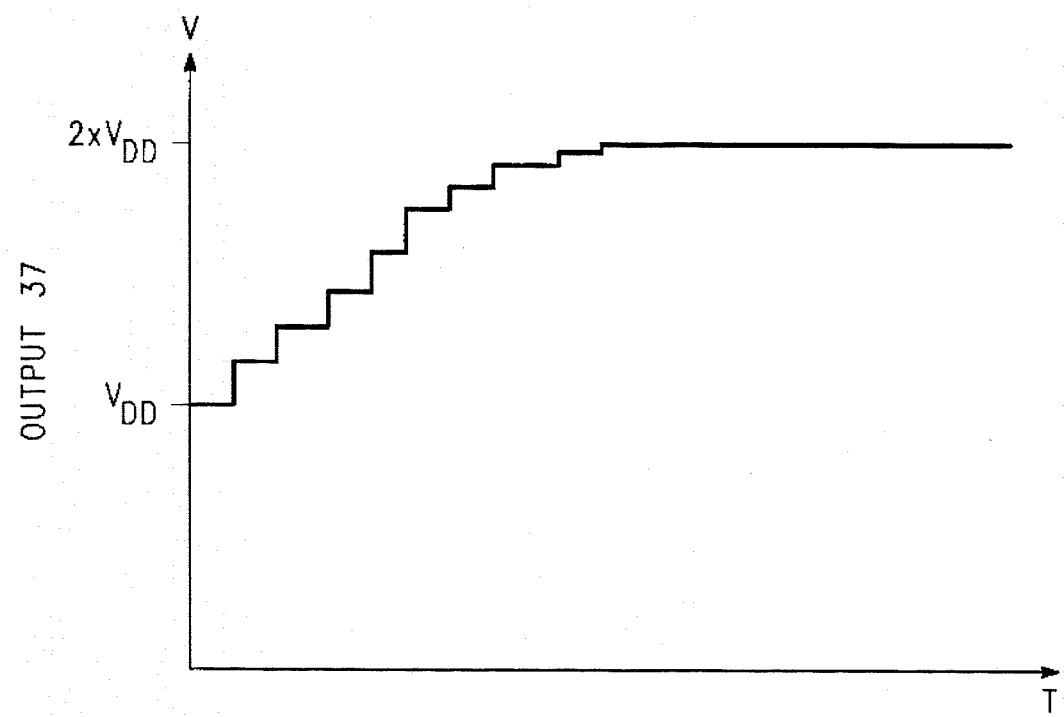
FIG. 3 is a graph showing the incremental increase in output voltage of the charge pump in FIG. 2 during startup.

FIG. 3 is a graph showing the output voltage at output 37 as it is incrementally increased during a charging sequence as described in FIG. 2. Each incremental gain in voltage corresponds to a first and second charging cycle. The graph assumes no loading on output 37.

Figure 4:
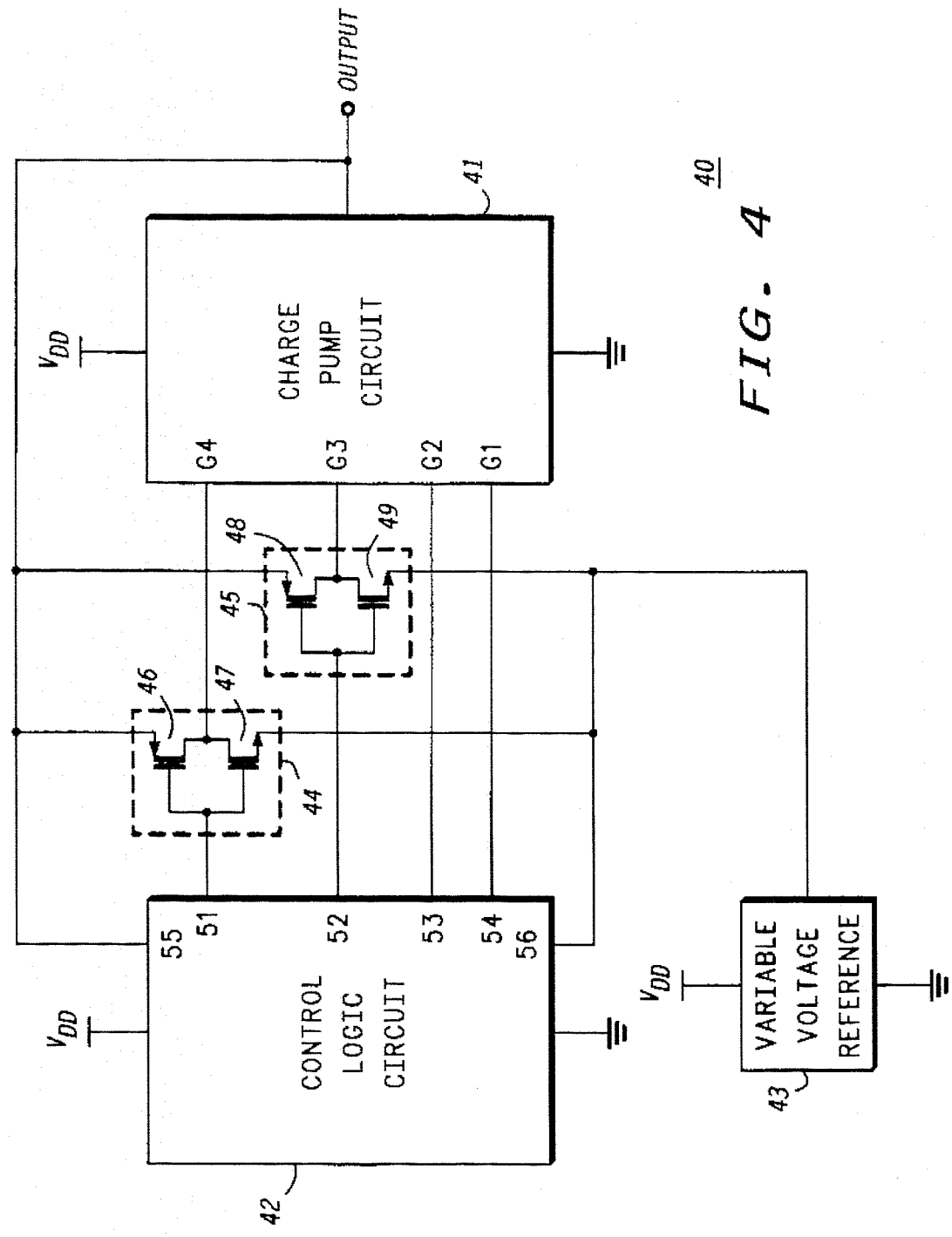
FIG. 4 is a schematic of a circuit for generating a voltage greater than a power supply voltage in accordance with the present invention.

FIG. 4 is a circuit 40 for generating an output voltage greater than a power supply voltage Vdd. Circuit 40 reduces a gate voltage on transmission gates within a charge pump circuit 41 that couple to a voltage greater than the power supply voltage Vdd. For illustration purposes charge pump circuit 41 corresponds to charge pump 30 of FIG. 2. Charge pump circuit 41 includes gate terminals G1–G4 corresponding to gate terminals S1–S4 of charge pump circuit 30 of FIG. 2 and an output for providing an output voltage greater than the power supply voltage Vdd.

Control logic 42 provides control signals for enabling the transmission gates in a charging sequence similar to that described hereinabove in the detailed description of FIG. 2. Control logic circuit 42 includes an input 55 coupled to the output of charge pump circuit 41, an input 56, an output 51, an output 52, an output 53 coupled to gate terminal G2, and an output 54 coupled to gate terminal G1.

A buffer 44 and a buffer 45 are variable for changing a voltage range between a logic one and logic zero level. Buffer 44 has an input coupled to output 51 of control logic circuit 42, an output coupled to gate terminal G4 of charge pump circuit 41, a first power supply terminal coupled to the output of charge pump circuit 41, and a second power supply terminal. Buffer 44 comprises a transistor 46 and a transistor 47.

Buffer 45 has an input coupled to output 52 of control logic circuit 42, an output coupled to gate terminal G3 of charge pump circuit 41, a first power supply terminal coupled to the output of charge pump circuit 41, and a second power supply terminal. Buffer 58 comprises a transistor 48 and a transistor 49. Transistors 46–49 each have a drain, gate, and a source respectively corresponding to a first electrode, control electrode, and a second electrode.

Transistor 46 of buffer 44 is a p-channel enhancement MOSFET having a drain, a gate, and a source respectively coupled to the output, input, and first power supply terminal of buffer 44. Transistor 47 is a n-channel enhancement MOSFET having a drain, a gate, and a source respectively coupled to the output, the input, and the second power supply terminal of buffer 44.

Transistor 48 of buffer 45 is a p-channel enhancement MOSFET having a drain, a gate, and a source respectively coupled to the output, input, and first power supply terminal of buffer 45. Transistor 49 is a n-channel enhancement MOSFET having a drain, a gate, and a source respectively coupled to the output, the input, and the second power supply terminal of buffer 45.

A variable voltage reference 43 changes a voltage range between a logic one level and a logic zero level at the output of buffers 44 and 45 to reduce a gate voltage on transmission gates within charge pump circuit 41. Variable voltage reference 43 includes an output terminal coupled to input 56 of control logic circuit 42 and the second power supply terminals of buffers 44 and 45.

As mentioned previously, the gate voltage of the transistors forming transmission gates within charge pump circuit 41 may exceed device specifications as the output voltage of charge pump circuit 41 increases beyond the power supply voltage Vdd, an example with actual voltages best illustrates the problem. Assume the power supply voltage Vdd is five volts and the initial voltage at the output of variable voltage reference 43 is ground. The output voltage of charge pump circuit 41 is precharged to five volts and reaches a maximum of ten volts. If the reliability of the transistors which form transmission gates within charge pump circuit 41 is affected at gate voltages greater than or equal to eight volts then the voltage range of the logic levels applied to the transmission gates must be reduced prior to the output voltage reaching eight volts. Furthermore, the magnitude of the logic one level provided by buffers 44 and 45 is at least the output voltage of charge pump circuit 41 to insure that the transmission gates therein are enabled for coupling the increased voltage.

Variable voltage reference 43 reduces the voltage range between the logic one level and the logic zero level at the outputs of buffers 44 and 45 prior to the output voltage of charge pump circuit 41 reaching eight volts. Initially, the output of variable voltage reference 43 is at zero volts or ground. The voltage range at the output of either buffer 44 and 45 is between the output voltage of charge pump circuit 41 (logic one level) and ground (logic zero level). In the description of the charge pump circuit 30 of FIG. 2 stated hereinabove, a voltage problem occurs on a device of a transmission gate when either gate terminal G3 and G4 are held at a logic zero level (ground). Variable voltage reference 43 changes from a first logic zero level (ground) to a second logic zero level (three volts) before the output voltage of charge pump circuit 41 reaches a hazardous level for transmission gate devices within charge pump circuit 41. The logic one level of buffers 44 and 45 remain the same. For example, if variable voltage reference 43 switched from ground to three volts when the output voltage of charge pump circuit 41 is at seven volts the voltage range between the logic zero level and the logic one level is reduced from seven volts to four volts. The three volt logic zero level is sufficient to disable the transmission gates within charge pump circuit 41 during the charging sequence. The gate voltages within charge pump circuit 41 reaches a maximum of seven volts when the output voltage of charge pump circuit 41 is seven volts and when it is at ten volts. The maximum of a seven volt gate voltage is less than the eight volt limit of the device specifications, thus the transmission gates are not stressed to a point where it could become a reliability issue.

In summary, a variable voltage reference reduces a gate voltage of a transmission gate within a charge pump circuit before an output voltage of the charge pump circuit exceeds a predetermined voltage. The variable voltage reference reduces the gate voltage (of a transmission gate) by reducing the voltage range between a logic one level and a logic zero level of a buffer coupled to the transmission gate. A gate voltage of a device forming the transmission gate is less than a maximum allowable gate voltage at the predetermined voltage. The reduced gate voltage is also less than the maximum allowable gate voltage when the output voltage of the charge pump circuit is at its maximum.

Although the actual implementation of the circuitry which comprises control logic circuit 42 is not critical, it will contain circuits for translating between standard logic levels (logic zero level=ground and logic one level=Vdd) and the logic levels provided by buffer 57 and buffer 58. Control logic circuit 42 receives the output voltage of charge pump circuit 41 and the voltage from variable voltage reference 43 for the translator circuits (not shown) to drive buffers 44 and 45.

Figure 5:
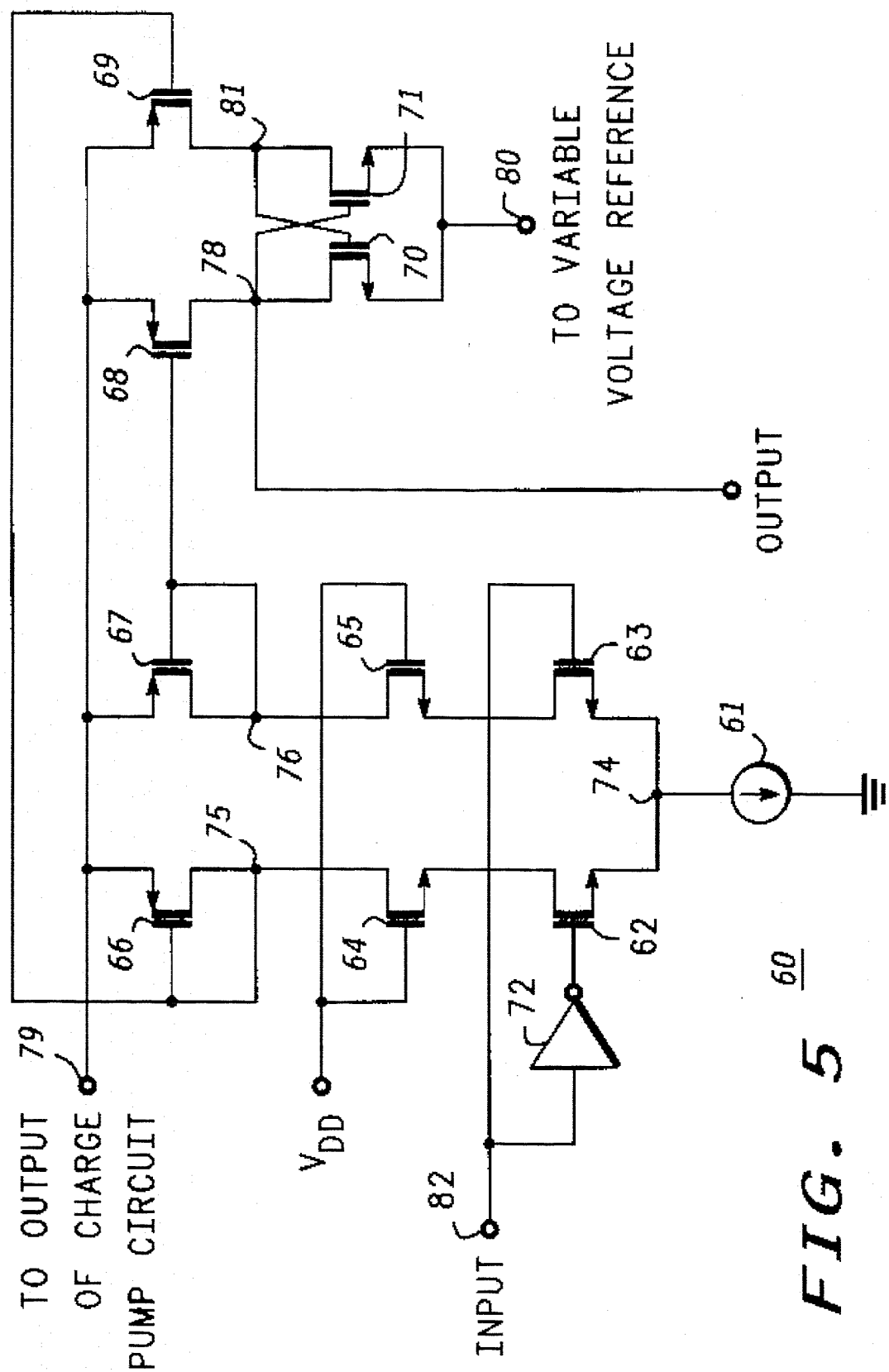
FIG. 5 is a schematic of a translator circuit for translating logic levels in accordance with the present invention.

FIG. 5 is a schematic diagram of a translator circuit 60 for converting a standard logic level to a translated logic level for reducing a gate voltage on a transmission gate within a charge pump circuit. Translator circuit 60 is used within control logic circuit 42 (FIG. 4) for providing logic signals to buffer 44 or buffer 45 (FIG. 4). Translator circuit 60 comprises current source 61, transistors 62–71, and an inverter 72. Transistors 62, 63, 64, 65, 70, and 71 are n-channel enhancement MOSFETs and transistors 66–69 are p-channel enhancement MOSFETs. Translator circuit 60 includes an input 82 for receiving a logic signal, a terminal 79 for receiving a voltage from a charge pump circuit, a terminal 80 for receiving a voltage from a variable voltage reference, and an output at a node 78 providing a translated logic signal.

Current source 61 provides a bias current for a first stage of translator circuit 60. The first stage comprises current source 61, inverter 72, and transistors 62–67. The first stage generates a differential voltage corresponding to a logic signal applied to input 79. Current source 61 includes a first terminal coupled for receiving a power supply voltage (e.g. ground) and a second terminal coupled to a node 74.

Transistors 62 and 63 form a differential input stage. Transistor 62 includes a drain, a gate, and a source coupled to node 74. Transistor 63 includes a drain, a gate coupled to input 79, and a source coupled to node 74. Inverter 72 includes an input coupled to input 79 and an output coupled to the gate of transistor 62.

Transistors 64 and 66 are in a cascode configuration to reduce a voltage drop across each device. Transistor 64 includes a drain coupled to a node 75, a gate coupled to for receiving a power supply voltage Vdd, and a source coupled to the drain of transistor 62. Transistor 66 includes a drain and a gate coupled to node 75, and a source coupled to terminal 79.

Similarly, transistors 65 and 67 are in a cascode configuration to reduce a voltage drop across each device. Transistor 65 includes a drain coupled to a node 76, a gate coupled for receiving the power supply voltage Vdd, and a source coupled to the drain of transistor 63. Transistor 67 includes a drain and a gate coupled to node 76, and a source coupled to terminal 79.

Transistors 68–71 form a second stage of translator circuit 60. Transistors 68–71 form a latch. The second stage receives a differential voltage from the first stage and generates a translated logic signal corresponding to the logic signal applied to input 79. Transistor 68 includes a drain coupled to node 78, a gate coupled to node 76, and a source coupled to terminal 79. Transistor 69 includes a drain coupled to a node 81, a gate coupled to node 75, and a source coupled to terminal 79. Transistor 70 includes a drain coupled to node 78, a gate coupled to node 81, and a source coupled to terminal 80. Transistor 71 includes a drain coupled to node 81, a gate coupled to node 78, and a source coupled to terminal 80.

Terminal 79 couples to a charge pump circuit that provides a voltage greater than or equal to the power supply voltage Vdd. Cascode circuitry is utilized in the first stage to reduce the voltage across each device which comprises the first stage of translator circuit 60 due to the increased voltage provided by the charge pump circuit. A logic signal having a voltage range between the power supply voltage Vdd and ground is applied to input 79. The differential input stage receives the logic signal and channels current from current source 61 to either transistors 66 or 67. Transistors 66 and 67 are loads for generating a differential voltage across nodes 75 and 76. The differential voltage is applied to the second stage of translator circuit 60 which is a latch. The power supply voltages provided to terminals 79 and 80 which power the latch are respectively the output voltage of the charge pump circuit and an output voltage of a variable voltage reference circuit. The logic signal is then translated by the latch having a voltage range from the output voltage of the charge pump circuit to the output voltage of the variable voltage reference circuit. The logic signal provided by translator circuit 60 corresponds to the logic levels provided by buffers 57 and 58 of FIG. 4 for reducing voltages across transmission gates of charge pump circuit 41 (FIG. 4).

Figure 6:
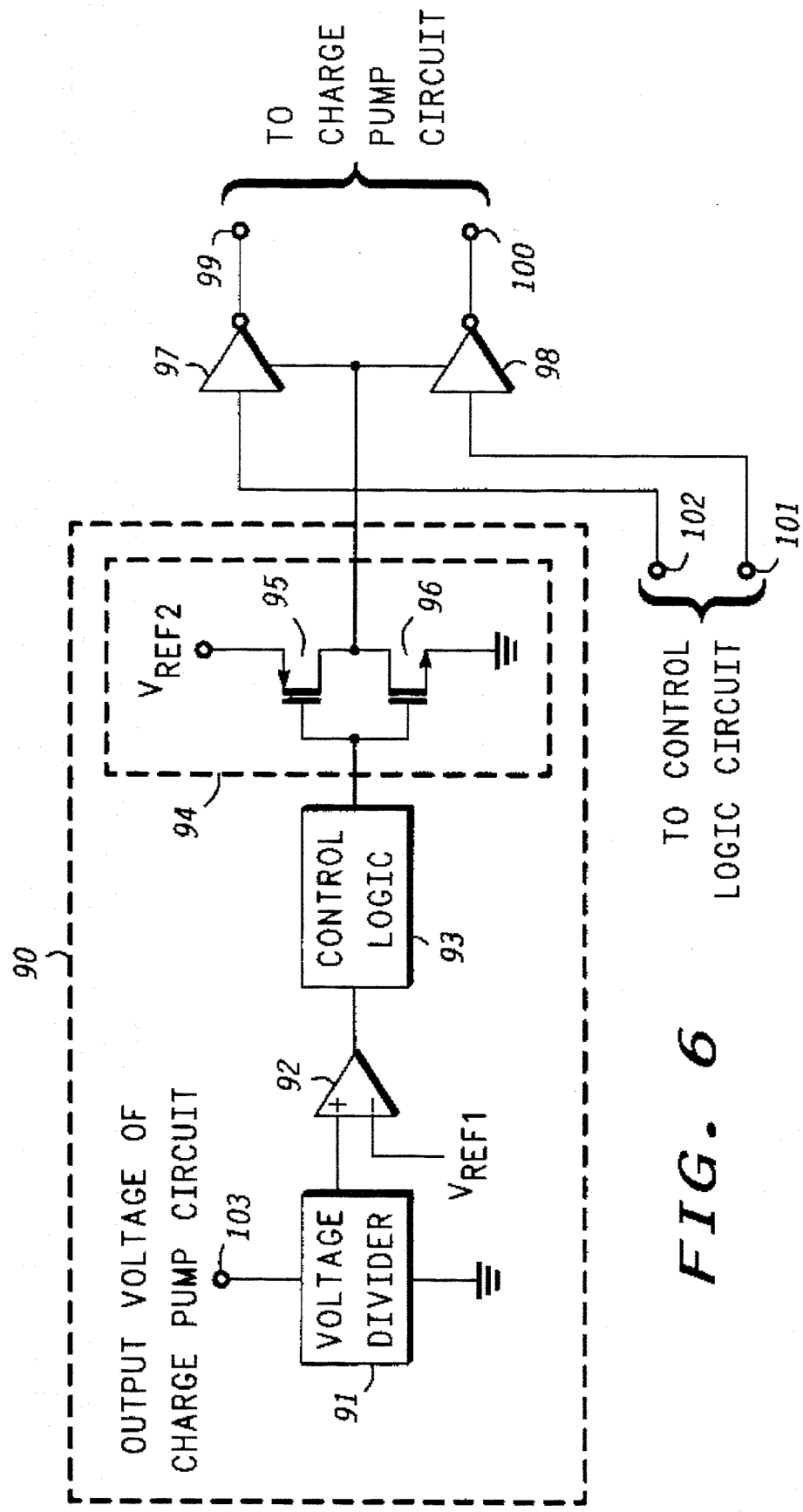
FIG. 6 is a schematic of a variable voltage reference circuit in accordance with the present invention.

FIG. 6 is a variable voltage reference circuit 90 for reducing a gate voltage on transmission gates within a charge pump circuit. Variable voltage reference circuit 90 corresponds to variable voltage reference 43 of FIG. 4. Variable voltage reference circuit 90 comprises a voltage divider 91, a comparator 92, control logic 93, and a buffer 94. Variable voltage reference 90 couples to power supply terminals of buffers 97 and 98 to reduce a voltage range between logic levels provided by the buffers.

Voltage divider 91 generates a voltage corresponding to an output voltage of a charge pump circuit. The voltage provided by voltage divider 91 has a magnitude less than a power supply voltage Vdd. Voltage divider 91 includes a terminal coupled to an output of the charge pump circuit and an output. Comparator 92 compares the output voltage of the charge pump circuit against a reference voltage Vref1 for signaling when the voltage range between logic levels of buffers 97 and 98 should be reduced to prevent damage to transmission gates within the charge pump circuit. Comparator 92 includes a non-inverting input coupled to the output of voltage divider 91, an inverting input coupled for receiving a reference voltage Vref1, and an output.

Control logic 93 includes an input coupled to the output of comparator 92 and an output. In this example, control logic 93 could be as simple as a buffer, in other applications, more control signals (not shown) may be applied to control logic 93 requiring more complex digital logic to generate an enabling signal for buffer 94.

Buffer 94 provides two voltage levels to the power supply terminals of buffers 97 and 98. Buffer 94 includes an input coupled to the output of control logic 93 and an output. Buffer 94 comprises transistors 95 and 96. Transistor 95 is a p-channel enhancement MOSFET having a drain coupled to the output of buffer 94, a gate coupled to the input of buffer 94, and a source coupled for receiving a reference voltage Vref2. Transistor 96 is a n-channel enhancement MOSFET having a drain coupled to the output of buffer 94, a gate coupled to the input of buffer, and a source coupled to ground. Transistors 95 and 96 are configured as an inverter.

Buffers 97 and 98 correspond to buffers 44 and 45 of FIG. 4 for providing a reduced gate voltage to transmission gates within charge pump circuit 41 (FIG. 4). Buffer 97 includes an input 102, an output 99, and a power supply terminal coupled to the output of buffer 94. Buffer 98 includes an input 101, an output 100, and a power supply terminal coupled to the output of buffer 94. The power supply terminals of buffers 97 and 98 couple to a source of a transistor as shown in FIG. 4. Inputs 101 and 102 of buffers 97 and 98 couple to a control logic circuit similar to control logic circuit 42 of FIG. 4. Outputs 99 and 100 of buffers 97 and 98 couple to gate terminals (not shown) of transmission gates within a charge pump circuit (as shown in FIG. 4).

Variable voltage reference 90 provides a first voltage when the output voltage of the charge pump circuit is below a predetermined voltage and a second voltage when the output voltage is greater than the predetermined voltage. In a first case, the voltage provided by voltage divider 91 is less than Vref1. Comparator 92 provides a logic zero level to control logic 93. Control logic 93 enables transistor 96 of buffer 94 to provide the first voltage (zero volts or ground) to the power supply terminals of buffers 97 and 98. Buffers 97 and 98 provide a logic signal having a voltage range between the output voltage of the charge pump circuit and ground (first voltage). The magnitude of the logic signal provided by either buffer 97 or 98 is not sufficient to damage a transmission gate within the charge pump circuit.

In a second case, the voltage provided by voltage divider 91 is greater than the reference voltage Vref1. This corresponds to the output voltage of the charge pump circuit being greater than the predetermined voltage. The predetermined voltage indicates that the output voltage of the charge pump circuit is approaching a level that could cause damage to the transmission gates within the charge pump circuit. Comparator 92 provides a logic one level to control logic 93. Control logic 93 enables transistor 95 of buffer 94 to provide the second voltage (Vref2) to the power supply terminals of buffers 97 and 98. Buffers 97 and 98 provide a logic signal having a voltage range between the output voltage of the charge pump circuit and Vref2 (second voltage). The reduced voltage range of the logic signal provided by buffers 97 and 98 prevents damage to transmission gates within the charge pump circuit as the output voltage (of the charge pump circuit) continues to increase.

Figure 7:
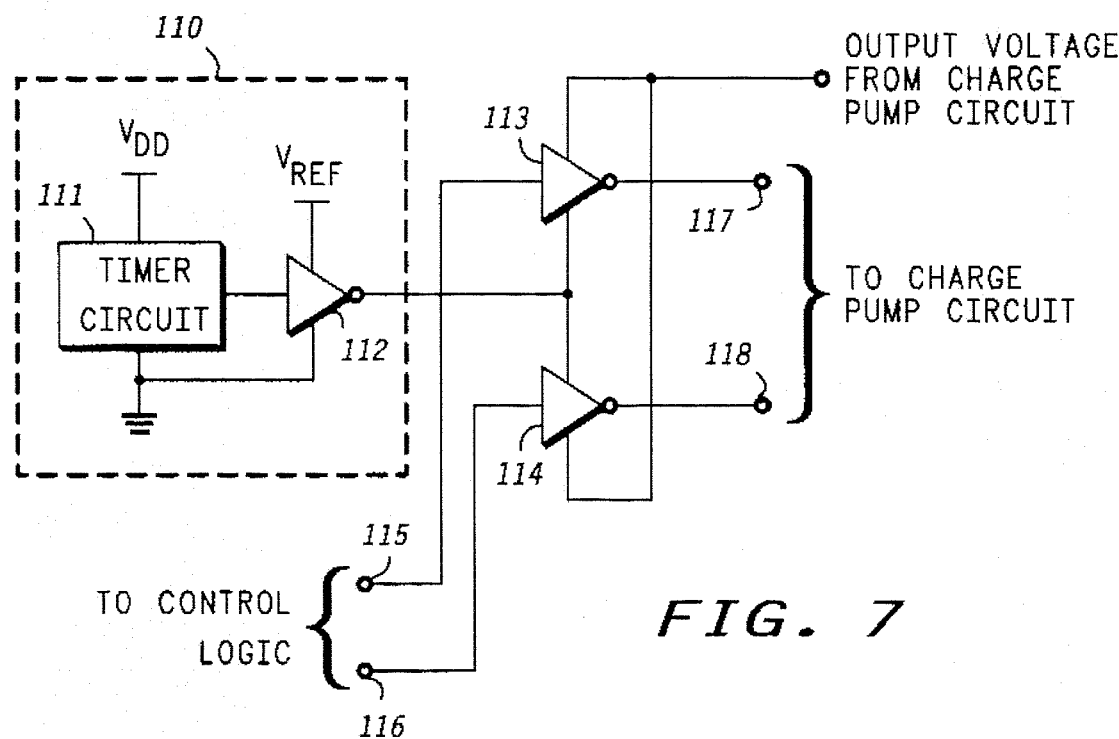
FIG. 7 is a schematic diagram of an alternate embodiment of a variable voltage reference circuit in accordance with the present invention.

FIG. 7 is a schematic diagram of a variable voltage reference circuit 110 in accordance with the present invention. Variable voltage reference circuit 110 provides a first and a second voltage for reducing a voltage range at an output of a buffer 113 and an output of a buffer 114. Buffers 113 and 114 correspond to buffers 44 and 45 (FIG. 4) that couple to gate terminals of transmission gates within charge pump circuit 41 of FIG. 4.

Variable voltage reference 110 comprises a timer circuit 111 and a buffer 112 for providing the first and second voltages. Timer circuit 111 includes an output for providing a signal after a predetermined time period. Buffer 112 includes an input coupled to the output of timer circuit 111, an output, a first power supply terminal coupled for receiving a reference voltage Vref, and a second power supply terminal coupled for receiving ground. The first voltage provided by buffer 112 is approximately ground and the second voltage provided by buffer 113 is approximately Vref. In this example, buffer 113 is configured as an inverter although a non-inverting buffer can also be used.

Buffer 113 includes an input 115 and an output 117. Buffer 114 includes an input 116 and an output 118. Inputs 115 and 116 couple to control logic corresponding to control logic circuit 42 of FIG. 4. Outputs 117 and 118 couple to gate terminals of a charge pump circuit corresponding to charge pump circuit 41 of FIG. 4. Although not shown, buffers 113 and 114 each have a power supply terminal coupled to an output of a charge pump circuit. Buffers 113 and 114 provide a logic signal having a reduced voltage range when the output of a charge pump circuit reaches a predetermined voltage. The reduced voltage range prevents damage to the devices which form transmission gates within the charge pump circuit that could be damaged by the high output voltage of the charge pump circuit.

Initially, timer circuit 111 provides a logic one level to buffer 112 producing a logic zero level at the output of buffer 112. The logic zero level is approximately at ground and allows buffers 113 and 114 to provide logic levels between an output voltage of a charge pump circuit and ground. After a predetermined time, timer circuit 111 provides a logic zero level to buffer 112 producing a logic one level at the output of buffer 112. The logic one level provided by buffer 112 is at a voltage of approximately Vref. Buffers 113 and 114 provide logic levels between the output voltage of the charge pump circuit and Vref. The predetermined time at which timer circuit 111 provides a logic zero level corresponds to a predetermined voltage at the output of the charge pump circuit. The output voltage at the output of the charge pump circuit will continue to increase to its maximum voltage (as the charge pump charges up) which increases the voltage range at the outputs of buffers 113 and 114. Vref is chosen to produce a gate voltage that is within process specifications of a device when the charge pump is at its maximum voltage.

Figure 8:
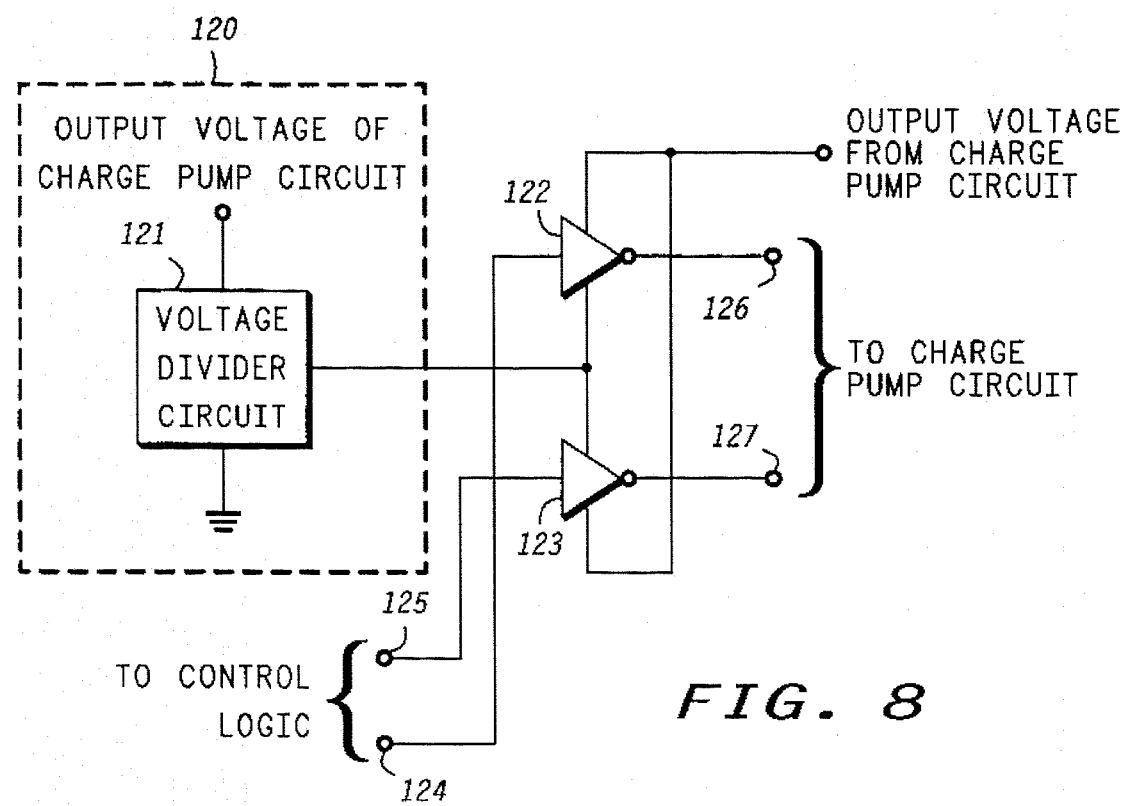
FIG. 8 is a schematic diagram of an alternate embodiment of a variable voltage reference circuit in accordance with the present invention.

FIG. 8 is a schematic diagram of a variable voltage reference circuit 120 in accordance with the present invention. Variable voltage reference circuit 120 provides a voltage for reducing a voltage range at an output of a buffer 122 and an output of a buffer 123. Buffers 122 and 123 correspond to buffers 44 and 45 (FIG. 4) that couple to gate terminals of transmission gates within charge pump circuit 41 of FIG. 4.

Variable voltage reference 120 comprises a voltage divider circuit 121. Voltage divider circuit 121 includes an input coupled for receiving an output voltage of a charge pump circuit and an output. Voltage divider circuit 121 provides a voltage at its output that is proportional to the output of the charge pump circuit. The voltage at the output of voltage divider circuit 121 incrementally increases as the output voltage of the charge pump circuit incrementally increases.

Buffer 122 includes an input 124 and an output 126. Buffer 123 includes an input 125 and an output 127. Inputs 124 and 125 couple to control logic corresponding to control logic circuit 42 of FIG. 4. Outputs 126 and 127 couple to gate terminals of a charge pump circuit corresponding to charge pump circuit 41 of FIG. 4. Although not shown, buffers 122 and 123 each have a power supply terminal coupled to an output of the charge pump circuit. Buffers 122 and 123 provide a logic signal having a voltage range that is reduced via voltage divider circuit 121 as the output voltage of the charge pump circuit increases. Reducing the voltage range of the logic levels of buffers 122 and 123 prevents the gate voltages of transmission gates within the charge pump circuit from reaching a voltage that could damage or reduce reliability of the devices which form the transmission gates.

Variable voltage reference 120 feeds back a portion of the output voltage of the charge pump circuit. The fedback portion of the voltage (at the output of voltage divider circuit 121) is used to decrease the voltage range of the logic levels provided by buffers 122 and 123 to prevent voltages that could damage devices within the charge pump circuit. Providing a portion of the output voltage of the charge pump circuit to reduce the voltage range also eliminates the need for voltage sensing circuitry.

By now it should be appreciated that a circuit for reducing a gate voltage of a transmission gate within a charge pump circuit has been provided. The transmission gate is coupled to a capacitor within the charge pump circuit for generating a voltage greater than a power supply voltage. A variable voltage reference reduces the voltage range between a logic one level and a logic zero level of a buffer that enables and disables the transmission gate before it provides a voltage that exceeds process specifications of the device which forms the transmission gate. In other words the gate voltage of the transmission gate is reduced before the output voltage of the charge pump circuit exceeds a predetermined voltage.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A method for operating a transmission gate coupled to a capacitor within a charge pump circuit, the charge pump circuit provides an output voltage having a magnitude greater than a magnitude of a power supply voltage of the charge pump circuit, the transmission gate being coupled to a voltage greater than the power supply voltage wherein a control signal applied to a control terminal of the transmission gate and the voltage greater than the power supply voltage coupled to the transmission gate generate a difference voltage across the transmission gate, the method comprising a step of reducing the difference voltage across the transmission gate before the output voltage of the charge pump circuit exceeds a voltage that damages the transmission gate.

2. The method as recited in claim 1 further including a step of:

sensing the output voltage of the charge pump; and decreasing a voltage range between logic levels of said control signal being applied to the transmission gate prior to the output voltage of the charge pump circuit exceeding said voltage that damages the transmission gate.

3. The method as recited in claim 1 wherein said step of reducing the difference voltage across the transmission gate before the output voltage of the charge pump circuit exceeds a voltage that damages the transmission gate includes the step of:

decreasing a voltage range between logic levels of said control signal being applied to the transmission gate after a predetermined time, said voltage range between logic levels being reduced prior to the output voltage of the charge pump circuit exceeding said voltage that damages the transmission gate.

4. The method as recited in claim 1 wherein said step of reducing the difference voltage across the transmission gate before the output voltage of the charge pump circuit exceeds a voltage that damages the transmission gate includes a step of incrementally decreasing a voltage range between logic levels of said control signal being applied to the transmission gate prior to the output voltage of the charge pump circuit exceeding the said voltage that damages the transmission gate.

5. The method as recited in claim 4 wherein said step of incrementally decreasing a voltage range between logic levels includes a step of decreasing said voltage range between logic levels of said control signal being applied to the transmission gate proportional to increases in the magnitude of the output voltage of the charge pump circuit.

6. A circuit for enabling and disabling a transmission gate coupled to a capacitor within a charge pump circuit, the charge pump circuit providing an output voltage having a magnitude greater than a magnitude of a power supply voltage of the charge pump circuit, the transmission gate being coupled to a voltage greater than the power supply voltage wherein a control signal applied to a control terminal of the transmission gate and the voltage greater than the power supply voltage coupled to the transmission gate generate a difference voltage across the transmission gate, the circuit comprising:

a buffer for providing a control signal to the control terminal of the transmission gate having an input, an output, and a power supply terminal; and a variable voltage reference having an output coupled to said power supply terminal of the buffer, said variable voltage reference for reducing a voltage range between logic levels of the control signal applied to the control terminal of the transmission gate before the difference voltage damages the transmission gate.

7. The circuit as recited in claim 6 further including a comparator for sensing when the output voltage of the charge pump circuit, said comparator enabling said variable voltage reference for reducing said voltage range between logic levels of the control signal applied to the control terminal of the transmission gate before the difference voltage damages the transmission gate.

8. The circuit as recited in claim 6 further including a timing circuit for enabling said variable voltage reference for reducing said voltage range between logic levels of the control signal applied to the control terminal of the transmission gate after a predetermined time period to prevent the difference voltage from damaging the transmission gate.

9. The circuit as recited in claim 6 wherein said variable voltage reference comprises a voltage divider coupled for receiving the output voltage of the charge pump circuit and providing a voltage proportional to the output voltage to said power supply terminal of said buffer for incrementally reducing said voltage range between logic levels of the control signal applied to the control terminal of the transmission gate.

10. A method for operating a transmission gate coupled to a capacitor within a charge pump circuit, the charge pump circuit provides an output voltage having a magnitude greater than a magnitude of a power supply voltage of the charge pump circuit, the transmission gate being enabled and disabled by a control signal, the method comprising the steps of:

sensing the output voltage of the charge pump circuit;

reducing a voltage range between a logic one level and a logic zero level of the logic signal before a damaging voltage is generated across the transmission gate.

11. A circuit for reducing a difference voltage across a transmission gate for preventing damage to the transmission gate, the transmission gate is coupled to a capacitor within a charge pump circuit, the charge pump circuit providing an output voltage having a magnitude greater than a magnitude of a power supply voltage of the charge pump circuit, the circuit comprising:

a comparator having a first input coupled for receiving a voltage proportional to the output voltage of the charge pump circuit, a second input coupled for receiving a first reference voltage, and an output;

a control logic circuit having an input coupled to said output of said comparator and an output;

a first transistor having a first electrode, a control electrode coupled to said output of said control logic circuit, and a second electrode coupled for receiving a second reference voltage;

a second transistor having a first electrode coupled to said first electrode of said first transistor, a control electrode coupled to said output of said control logic circuit, and a second electrode coupled for receiving a third reference voltage; and a buffer having an input coupled for receiving a logic signal, an output coupled to a gate of the transmission gate, and a power supply terminal coupled to said first electrode of said first transistor, said control logic circuit enabling said first transistor for coupling said second reference voltage to said power supply terminal of said buffer when a magnitude of said voltage proportional to the output voltage of the charge pump circuit is less than a magnitude of said first reference voltage, said control logic circuit enabling said second transistor for coupling said third reference voltage to said power supply terminal of said buffer when said magnitude of said voltage proportional to the output voltage of the charge pump circuit is greater than said magnitude of said first reference voltage, said third reference voltage reducing the gate voltage of the transmission gate.

12. The circuit as recited in claim 11 further including a voltage divider having a first terminal coupled for receiving the output voltage of the charge pump circuit and a second terminal for providing said voltage proportional to the output voltage of the charge pump circuit.

13. A method for operating a transmission gate coupled to a capacitor within a charge pump circuit, the charge pump circuit provides an output voltage having a magnitude greater than a magnitude of a power supply voltage of the charge pump circuit, the method comprising the steps of:

providing a logic signal to the transmission gate for enabling and disabling the transmission gate, said logic signal being at either a first logic level or a second logic level, said first and second logic levels respectively having first and second voltages; and changing said second logic level from said second voltage to a third voltage when a magnitude of the output voltage of the charge pump circuit before a damaging voltage is generated across the transmission gate wherein a voltage range between said first and second logic levels is reduced by said third voltage.

14. A circuit for reducing a difference voltage across a transmission gate, the transmission gate is coupled to a capacitor within a charge pump circuit, the charge pump circuit providing an output voltage having a magnitude greater than a magnitude of a power supply voltage of the charge pump circuit, the circuit comprising:

a timing circuit having an output for providing a first logic level for a predetermined time period and a second logic level after said predetermined time period;

a first buffer having an input coupled to said output of said timing circuit and an output, said buffer providing a first voltage for said predetermined time period and a second voltage after said predetermined time period; and a second buffer for enabling and disabling the transmission gate, said second buffer having an input for receiving a control signal, an output coupled to a control terminal of the transmission gate, and a power supply terminal coupled to said output of said first buffer, said second buffer reducing said difference voltage across the transmission after said predetermined time period to prevent damage to the transmission gate.

15. The circuit as recited in claim 14 wherein said timing circuit provides said first logic level for said predetermined time period during power up of the charge pump circuit.

16. A method for operating a transmission gate coupled to a capacitor within a charge pump circuit, the charge pump circuit provides an output voltage having a magnitude greater than a magnitude of a power supply voltage of the charge pump circuit, the method comprising a step of:

incrementally changing a magnitude of a logic level being applied to a control terminal of the transmission gate prior to a damaging voltage being generated across the transmission gate wherein a difference voltage across the transmission gate is reduced by said incremental changing of said logic level.

17. The method as recited in claim 16 wherein said step of incrementally changing a logic level being applied to a control terminal of the transmission gate includes a step of decreasing a voltage range between logic levels being applied to said control terminal of the transmission gate as a magnitude of the output voltage of the charge pump circuit increases.

18. A circuit for reducing a control voltage of a transmission gate, the transmission gate is coupled to a capacitor within a charge pump circuit, the charge pump circuit providing an output voltage having a magnitude greater than a magnitude of a power supply voltage of the charge pump circuit, the circuit comprising:

a voltage divider having a first terminal coupled for receiving the output voltage of the charge pump circuit and a second terminal for providing a voltage proportional to the output voltage of the charge pump circuit; and a buffer having an input for receiving a control signal, an output coupled to a control terminal of the transmission gate, and a power supply terminal coupled to said second terminal of said voltage divider circuit, said voltage divider reducing a difference voltage across the transmission gate as the output voltage of the charge pump circuit increases for preventing said difference voltage from damaging the transmission gate.

* * * * *

UNITED STATES PATENT AND TRADEMARK OFFICE
CERTIFICATE OF CORRECTION

PATENT NO. : 5,539,351
DATED : July 23, 1996
INVENTOR(S) : Ben Gilsdorf, et al

It is certified that error appears in the above-indentified patent and that said Letters Patent is hereby corrected as shown below:

Title page, item [54] Title of the Invention, "VOLAGE" should read --VOLTAGE--.

Col. 1 line 2, "VOLAGE" should read --VOLTAGE--.

Signed and Sealed this

Twenty-sixth Day of August, 1997

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,539,351
DATED : July 23, 1996
INVENTOR(S) : Ben Gilsdorf, Gary W. Hoshizaki, John H. Quigley It is certified that error appears in the above-indentified patent and that said Letters Patent is hereby corrected as shown below:

The Name of Assignee was not included on the first page of the patent.

Please show that Motorola, Inc. is the assignee, i.e., section [73]

Signed and Sealed this

Twenty-eighth Day of October, 1997

Attest:

BRUCE LEHMAN

Attesting Officer

Commissioner of Patents and Trademarks